(12) United States Patent
Lin

(10) Patent No.: US 9,433,859 B1
(45) Date of Patent: Sep. 6, 2016

(54) FREQUENCY BASED REQUEST THROTTLING AND AGGREGATION

(71) Applicant: KABAM, INC., San Francisco, CA (US)

(72) Inventor: Michael Lin, Saratoga, CA (US)

(73) Assignee: KABAM, INC., San Francisco, CA (US)

( * ) Notice: Subject to any disclaimer, the term of this patent is extended or adjusted under 35 U.S.C. 154(b) by 133 days.

(21) Appl. No.: 14/248,055

(22) Filed: Apr. 8, 2014

(51) Int. Cl.
*A63F 13/12* (2006.01)
*A63F 13/30* (2014.01)

(52) U.S. Cl.
CPC ............ *A63F 13/12* (2013.01); *A63F 2300/40* (2013.01)

(58) Field of Classification Search
USPC .......................................................... 463/42
See application file for complete search history.

(56) References Cited

U.S. PATENT DOCUMENTS

| 8,543,642 B2 | 9/2013 | Corbett et al. ................ 709/203 |
| 2005/0120160 A1 | 6/2005 | Plouffe et al. .................... 711/1 |
| 2011/0216060 A1* | 9/2011 | Weising .................... G09G 5/08 345/419 |
| 2013/0159068 A1 | 6/2013 | Chang et al. ................ 705/7.41 |
| 2014/0002359 A1* | 1/2014 | Weising .................... G09G 5/08 345/158 |
| 2014/0232652 A1* | 8/2014 | Weising .................... G09G 5/08 345/158 |
| 2014/0235311 A1* | 8/2014 | Weising .................... G09G 5/08 463/14 |

* cited by examiner

*Primary Examiner* — Pierre E Elisca
(74) *Attorney, Agent, or Firm* — Sheppard Mullin Richter & Hampton LLP

(57) ABSTRACT

A system and method configured to provide remote access to a virtual space and enhance the efficiency of server operations associated with the virtual space. This system and method has particular application to online applications such as online games wherein many players are simultaneously competing for limited server resources in connection with game play. In some implementations, the system and method includes executing an instance of an online game and using the instance of the online game to enable participation in the online game by multiple users through multiple client computing platforms, wherein participation in the online game by the users includes entering and/or selecting requests on the client computing platforms that are executed in the instance of the online game. The system and method of the present invention also includes organizing the requests such that duplicative requests are combined into a single request and providing the organized requests for execution by one or more servers.

24 Claims, 2 Drawing Sheets

FREQUENCY BASED REQUEST THROTTLING AND AGGREGATION

FIELD OF THE DISCLOSURE

This disclosure relates to systems and methodologies for reducing processing loads on servers in an environment where multiple requests may be competing for a response from an overloaded server.

BACKGROUND

In many cases where multiple clients are issuing requests to a server or set of servers, those servers may become overloaded and response times may be negatively impacted. This problem can be compounded when users operating the client devices become frustrated with response times and begin submitting multiple requests seeking the same or similar result.

For example, in the context of an online game where users interact with a game through a client device such as a smartphone or tablet and wherein command requests generated as a result of gameplay are transmitted to a centralized server, server overload can cause undesirable delays in connection with gameplay. This is especially true in the case where a great many players are playing the game simultaneously from a great many client devices.

In some cases, players may become frustrated with the delay in response as reflected in the operation of the game, and as a result, they may repeatedly take the same action hoping to achieve the desired result as quickly as possible. For example, a player seeking to add a building element when constructing a building may repeatedly click on the element or move the element from one place to another multiple times hoping that the desired action will quickly be reflected in the game. Rather than speeding operation, these repeated requests to the server must all be processed and typically results in an overall slowing of game response time across all simultaneous players.

In addition to the above disadvantages, when the client device is a battery powered mobile device such as a mobile phone, tablet, etc., the RF energy required to transmit multiple commands which are duplicative is an unnecessary drain on battery power.

SUMMARY

One aspect of the disclosure relates to a system and method configured to provided remote access to a virtual space and enhance the efficiency of server operations associated with the virtual space. This system and method has particular application to online applications such as online games wherein many players are simultaneously competing for limited server resources in connection with game play.

In some implementations, the system and method include executing an instance of an online game, and using the instance of the online game to enable participation in the online game by multiple users through multiple client computing platforms. Enabling participation in the online game by users includes entering and/or selecting requests on the client computing platforms that are executed in the instance of the online game.

The system and method includes receiving requests and organizing the requests prior to the requests being provided for execution, wherein such organization includes aggregating duplicative requests from individual client computing platforms such that duplicative requests received from a first client computing platform are aggregated into a single request.

The system and method includes providing organized the requests for execution. In some implementations, requests are organized and queued at the client device prior to transmission to the server. In alternative implementations, requests are sent from client devices to the server and collective requests received at the server are organized at the server prior to submission for execution.

In exemplary implementations, providing remote access to a virtual space may be performed by processors executing computer program components. In some implementations, the system may include one or more servers. The server(s) may be configured to communicate with one or more client computing platforms according to a client/server architecture. The users may access the system via the client computing platforms, for instance, to engage in game play and/or participate in events such as tournaments.

The server(s) may be configured to execute one or more computer program components to provide one or more games to users (or players). The computer program components may include one or more of a game component, a command request processing component, a command transmission component and/or other components. It is noted that the client computing platforms may include one or more computer program components that are the same as or similar to the computer program components of the server(s) to facilitate individualized content made available to the users of online games.

The game component may be configured to execute an instance of an online game, and to use the instance of the online game to enable participation in the online game by multiple users through multiple client computing platforms, wherein participation in the online game by the users includes entering and/or selecting requests on the client computing platforms that are executed in the instance of the online game by the game component.

The command request processing component may be configured to receive requests from the client computing platforms and organize the requests prior to the requests being provided to the game component for execution, wherein such organization includes aggregating duplicative requests from individual client computing platforms such that duplicative requests received from a first client computing platform are aggregated into a single request.

The command transmission component may be configured to provide the organized requests to the game component for execution.

One aspect of the disclosure relates to a computer-implemented method for providing remote access to a virtual space, the method being implemented in a computer system that includes one or more physical processors and storage media storing machine-readable instructions. The method may be implemented in a computer system that includes one or more physical processors and storage media storing machine-readable instructions. The method includes executing an instance of an online game. The method further includes implementing the instance of the online game to enable participation in the online game by multiple users through multiple client computing platforms. The method further includes entering and/or selecting requests on the client computing platforms that are executed in the instance of the online game.

In some implementations, the method includes executing an instance of an online game, and using the instance of the online game to enable participation in the online game by multiple users through multiple client computing platforms, wherein participation in the online game by the users includes entering and/or selecting requests on the client computing platforms that are executed in the instance of the online game.

The method of the present invention also includes organizing the requests such that duplicative requests are combined into a single request and providing the organized requests for execution.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
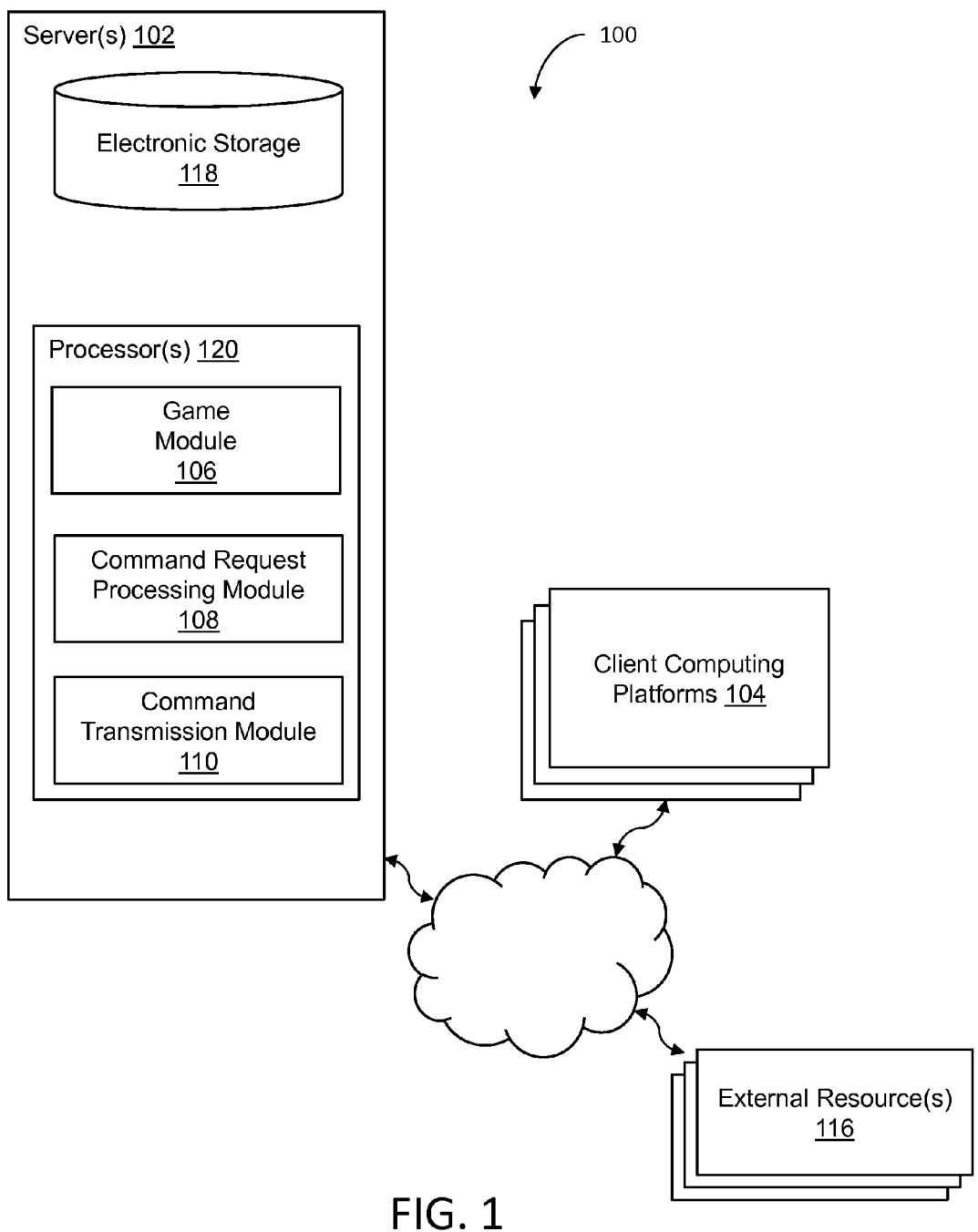
FIG. 1 illustrates a system configured to provide a virtual space, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, a system and methodology is provided which provides remote access to a virtual space and enhances the efficiency of server operations associated with the virtual space. This system and method has particular application to online applications such as online games wherein many players are simultaneously competing for limited server resources in connection with game play.

This is accomplished according to various embodiments wherein all client requests for server processing are routed through a centralized request delegate. In some embodiments, the delegate serializes and controls the presentation of concurrent requests to the server. In some embodiments, the delegate aggregates callbacks which resolve to the same endpoint so that multiple instances of the same action can be batched and may be completed simultaneously.

Embodiments may be configured such that the request delegate is present either on the client device or remote from the client device such as on the server, or both. In embodiments where the request delegate functionality is located on the client device, requests are organized and queued by the client device prior to transmission to the server. Alternatively, when the request delegate functionality is located on or in connection with the server, the request delegate function serves as a channel through which all requests must be routed prior to presentation to the server for execution.

According to the present invention, when multiple requests are made to an endpoint where different actions are to be performed but wherein the same result would be returned, those requests are aggregated. In some embodiments, these requests are combined into a single request as applicable so that server processing load is reduced. In some embodiments, some or all of the individual requests must still be sent to the server for processing rather than combining all requests. In this case, however, the timing of the presentation of the requests for processing is controlled so as to maximize server processing efficiency. By way of example, when a game player is collecting different kinds of resources, the requests generated by these game actions may be combined into a single request to an endpoint wherein, although different actions are being performed, the same result will ultimately be returned by the server.

According to some embodiments, users that are frustrated by slow response time in, for example, gaming applications, may repeatedly attempt to perform the same action over and over again hoping that they will see the effect in the virtual space of the game. This has the practical effect of further overloading a server or set of servers that are already overloaded with duplicative requests. According to the present invention, these requests can be identified as identical such that some or all of the duplicative requests are never presented to the server for execution. Similarly, if client devices and/or server configurations have been set such that polling requests are made too frequently given present server load, the request delegate of the present invention may serve to limit and control requests actually reaching the server during periods of heavy activity so as to maximize resource and processing efficiency.

According to the present invention, the system and methodology increases client responsiveness as well as providing a layer of protection against further degradation of server performance when the server(s) are already at or close to capacity. For mobile devices serving as clients, battery consumption can be reduced because fewer requests overall are transmitted thus limiting requests for and transmission of external data which can be an expensive operation from the point of view of power usage. In some embodiments, the present invention further allows for the total number of outgoing requests from a client device to be granularly controlled while still permitting the throttling of application behavior as needed depending upon response times observed from the server at any given point of time.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program components. The computer program components may include one or more of a game component 106, a command request processing component 108, a command transmission component 110 and/or other components. As noted, the client computing platform(s) 104 may include one or more computer program components that are the same as or similar to the computer program components of the server(s) 102 to facilitate in-game actions.

The game component 106 may be configured to execute an instance of a game to facilitate presentation of the game to users. The game component 106 may be configured to implement in-game actions in the instance of the game, in response to action requests for the in-game actions by the users.

The game may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

The command request processing component 108 may be configured to process and organize requests generated from applications including requests and commands generated by game component 106 prior to such requests/commands being presented to the server for processing. In some embodiments, command request processing component 108 is located on server 102 and receives requests from client computing platforms 104 wherein command request processing component 108 controls the presentation of the requests to server 102 for execution of such requests.

In alternative embodiments (not shown in FIG. 1), command request processing component 108 may be resident on client computing platforms 104 such that requests are processed by command request processing component 108 as described below before ever reaching server 102. It is also possible in some embodiments for command processing component to be resident on both server 102 and one or more client computing platforms 104.

Command request processing component 108 serves to control requests as they are generated and efficiently control the routing of such requests to server 102 to minimize the overload of available processing resources. As described above, this is achieved both by eliminating the presentation of duplicative requests (such as when a user repeatedly generates the same request because he or she is frustrated by response time) and by combining requests that are routed to the same endpoint and which will cause the same result to be generated.

According to the present invention in some embodiments, command request processing component 108 operates using a centralized class through which all communication from the client computing platforms 104 to the server 102 are routed. As noted, alternatively, all requests may be communicated to server 102 with command request processing component 108 operating on the server to control requests submitted for processing. In each case, and in some embodiments, requests are tagged by type and preferably the parameters associated with each request are hashed to simplify evaluation as against similar requests.

In some embodiments, requests may include an "identical" parameter which determines whether these commands should be batched with identical requests (and wherein all requests must be submitted for processing) or whether the completion of one request should be considered sufficient to complete all requests. Command request processing component 108 preferably comprises a queue for holding requests as they are received from game component 106 as well as a dictionary in which requests are organized by type. Preferably, each request type hashes to a queue of responses that contains the callback information associated with each request type.

According to the present invention, when a request is generated from game component 106, command request processing component 108 first compares the request types as against existing request types available in the aforementioned dictionary. If no requests of that type are found, then the request and type are added to the queue and to the dictionary. When another request of the same type is presented to command request processing component 108, its type and parameters are compared to the initial request of that type. If the request is deemed to be a match based on type and its parameters and if the request is tagged with the "identical" parameter, then the callback is added to the queue with the previous request. If not, the request is treated as having a new and unique type.

In some embodiments, different types of requests may be weighted by priority such that requests that are more critical to the operation of the virtual space or which are the direct result of user action, could be weighted more heavily so as to increase the perception of responsiveness within the virtual space. Similarly, the number of pending callbacks that are attached to an individual request can be weighted such that the more a user performs an action, the higher the priority assigned to the request even though under normal processing, the request would not otherwise be a higher priority request.

Command transmission component 110 may be configured to selectively transmit requests to server 102 for processing as directed by command request processing component 108. According to embodiments where command request processing component 108 is located on client computing platform 104, command transmission component 110 is similarly located. In this case, command transmission component serves to direct client computing platform 104 to transmit requests selectively to server 102. Alternatively, if command request processing component 108 is located on server 102, command transmission component 110 is similarly located and serves to control which requests which have been received from client computing platform 104 should be executed on server 102 and when.

According to the present invention, command transmission component 110 transmits the highest priority request from the queue in command processing component 108 to server 102 as each new request completes. Command transmission component 100 preferably only transmits the next request to server 102 if the previous request has finished executing or if multiple concurrent requests have been enabled. This serves to throttle clients from overburdening server 102 if previously dispatched requests have not yet completed execution.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 106, 108 and 110. Processor 120 may be configured to execute components 106, 108 and 110 by software; hardware; firmware; some combination of software, hardware, and/or firmware; and/or other mechanisms for configuring processing capabilities on processor 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, and 110 are illustrated in FIG. 1 as being implemented within a single processing unit, in implementations in which processor 120 includes multiple processing units, one or more of components 106, 108 and 110 may be implemented remotely from the other components. The description of the functionality provided by the different components 106, 108 and 110 described above is for illustrative purposes, and is not intended to be limiting, as any of components 106, 108, 110 may provide more or less functionality than is described. For example, one or more of components 106, 108 and 110 may be eliminated, and some or all of its functionality may be provided by other ones of components 106, 108 and 110. As another example, processor 120 may be configured to execute one or more additional components that may perform some or all of the functionality attributed below to one of components 106, 108 and 110.

Figure 2:
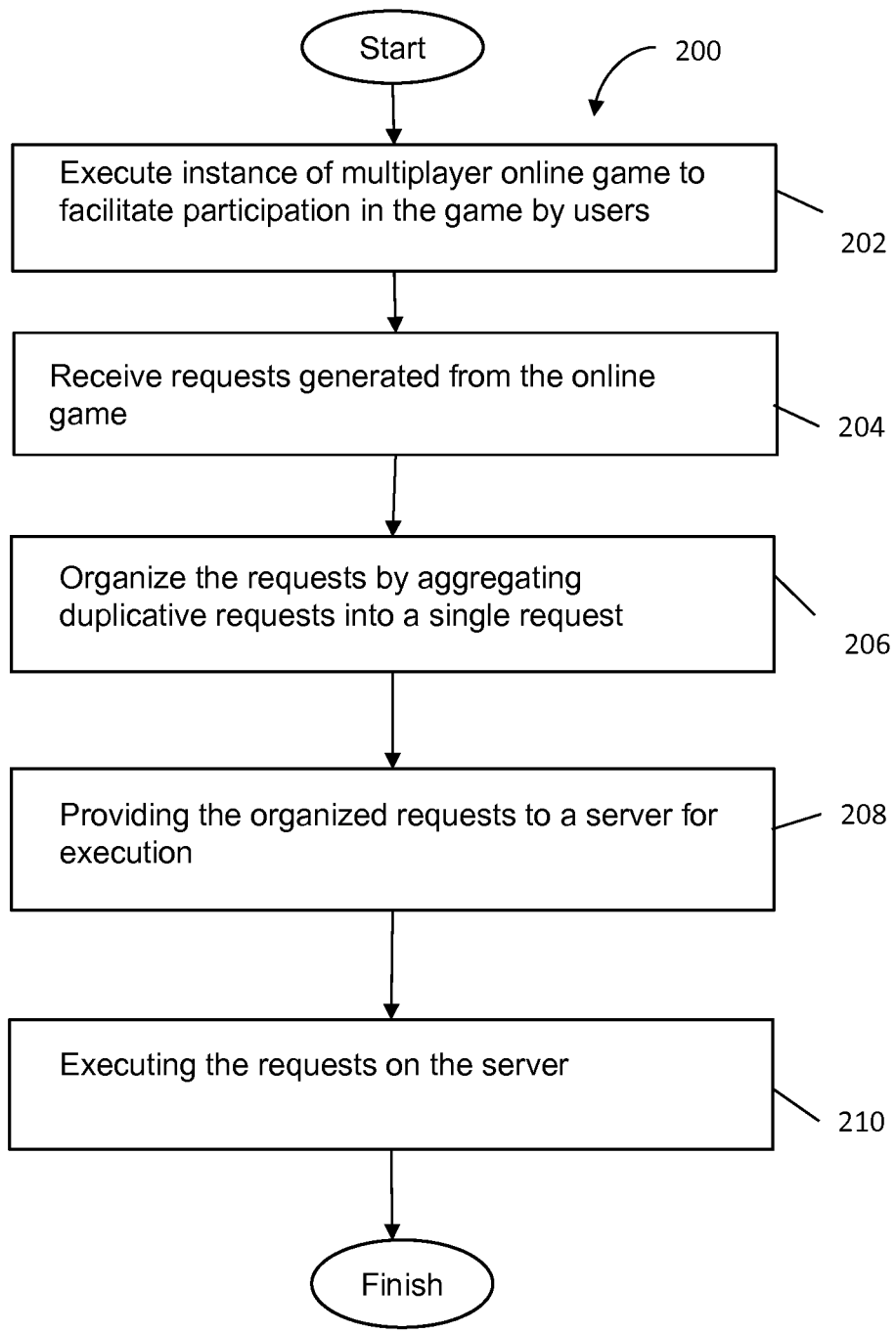
FIG. 2 illustrates a method of providing remote access to a virtual space by client computing devices for interaction by users.

FIG. 2 illustrates a method for reducing processing loads on servers in an environment where multiple requests may be competing for a response from an overloaded server. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate participation in the game by users. Operation 202 may be performed by a game component that is the same as or similar to game component 106, in accordance with one or more implementations.

At an operation 204, requests which are generated as a result of user interaction with the online game are received as generated. Operation 204 may be performed by a command request processing component that is the same as or similar to command request processing component 108, in accordance with one or more implementations.

At an operation 206, requests are organized for efficiency and to minimize server overload as described above. As described above, this may include combining duplicative requests, such as when a user repeatedly attempts to perform the same operation, into a single request. Additionally, organization may include grouping requests by type and combining them when they are to achieve the same result at the same endpoint as discussed above. Operation 206 may be performed by a command request processing component that is the same as or similar to command request processing component 108, in accordance with one or more implementations.

At operation 208, requests which have been organized as a result of operation 206 are next provided to a server or set of servers for execution. Operation 208 may be performed by a command transmission component that is the same as or similar to command transmission component 110, in accordance with one or more implementations.

At an operation 210, the organized requests are executed on the server. Operation 210 may be performed by a server or servers that is/are the same as or similar to server 102 or alternative server(s), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system configured to provide remote access to a virtual space, the online gaming system comprising:
   one or more physical computer processors configured by a non-transitory machine-readable instructions to:
      execute an instance of an online game, and to use the instance of the online game to enable participation in the online game by multiple users through multiple client computing platforms, wherein participation in the online game by the users includes entering and/or selecting requests on the client computing platforms that are executed in the instance of the online game;
      receive requests from the client computing platforms and organize the requests prior to the requests being executed, wherein such organization includes aggregating duplicative requests from individual client computing platforms such that duplicative requests received from a first client computing platform are aggregated into a single request; and
      provide the organized requests for execution.

2. The online gaming system of claim 1 wherein the one or more physical computer processors are further configured to organize said requests such that one or more duplicative requests from said first client computing platform is disregarded.

3. The online gaming system of claim 1 wherein the one or more physical computer processors are further configured to organize said duplicative requests simultaneously.

4. The online gaming system of claim 1 wherein the one or more physical computer processors are further configured to re-order received requests in an order different from the order in which said requests are received.

5. The online gaming system of claim 1 wherein the one or more physical computer processors are further configured to transmit the highest priority request prior to the transmission of any other requests in said queue.

6. The online gaming system of claim 1 wherein said requests are associated with an identical parameter indicative of whether said requests of the same request type should be batched and wherein one or more physical computer processors are further configured to transmit requests sharing the same request type in batch for execution when said identical parameter associated with said request type specifies that requests of said request type should be transmitted in batch.

7. The online gaming system of claim 1 wherein said requests are associated with an identical parameter indicative of whether said requests of the same request type should be batched and wherein the one or more physical computer processors are further configured to transmit requests sharing the same request type as a single request when said identical parameter associated with said request type specifies that requests of said request type should not be transmitted in batch.

8. The online gaming system of claim 1 wherein the one or more physical computer processors are further configured to maintain a database of at least one request type and at least one characteristic associated with each of said at least one request type and further being configured to assign each incoming requests to one of said at least one request types based on said at least one characteristic.

9. The online gaming system of claim 8 wherein each of said request types are hashed to a queue of responses containing callback information associated with said request type.

10. The online gaming system of claim 1 wherein the one or more physical processors are selectively enabled to concurrently transmit multiple requests for execution.

11. The online gaming system of claim 1 wherein specific request types are prioritized for earlier transmission than other request types.

12. The online gaming system of claim 11 wherein request types having a greater number of queued input requests associated therewith are prioritized over request types having relatively lesser number of queued input requests associated therewith.

13. A computer-implemented method of providing remote access to a virtual space, the method being implemented in a computer system comprising one or more processors configured to execute computer program components, the method comprising:
  executing an instance of an online game, and using the instance of the online game to enable participation in the online game by multiple users through multiple client computing platforms, wherein participation in the online game by the users includes entering and/or selecting requests on the client computing platforms that are executed in the instance of the online game;
  receiving requests and organizing the requests prior to the requests being provided for execution, wherein such organization includes aggregating duplicative requests from individual client computing platforms such that duplicative requests received from a first client computing platform are aggregated into a single request; and
  providing the organized requests for execution.

14. The computer implemented method of claim 13 wherein said requests are organized such that one or more duplicative requests from said first client computing platform is disregarded.

15. The computer implemented method of claim 13 wherein said duplicative requests are organized simultaneously.

16. The computer implemented method of claim 13 wherein said received requests are re-ordered in an order different from the order in which said requests are received.

17. The computer implemented method of claim 13 wherein said highest priority requests are transmitted prior to the transmission of any other requests in said queue.

18. The computer implemented method of claim 13 wherein said requests are associated with an identical parameter indicative of whether said requests of the same request type should be batched and wherein requests sharing the same request type are transmitted in batch when said identical parameter associated with said request type specifies that requests of said request type should be transmitted in batch.

19. The computer implemented method of claim 13 wherein said requests are associated with an identical parameter indicative of whether said requests of the same request type should be batched and wherein requests sharing the same request type are transmitted as a single request when said identical parameter associated with said request type specifies that requests of said request type should not be transmitted in batch.

20. The computer implemented method of claim 13 further comprising maintaining a database of at least one request types and at least one characteristic associated with each of said at least one request type and further assigning each incoming request to one of said at least one request types based on said at least one characteristic.

21. The computer implemented method of claim 20 wherein each of said request types are hashed to a queue of responses containing callback information associated with said request type.

22. The computer implemented method of claim 13 wherein said command transmission component is selectively enabled to concurrently transmit multiple requests.

23. The computer implemented method of claim 13 wherein specific request types are prioritized for earlier transmission than other request types.

24. The computer implemented method of claim 23 wherein request types having a greater number of queued input requests associated therewith are prioritized over request types having relatively lesser number of queued input requests associated therewith.

* * * * *